US008538177B2

(12) United States Patent
Xu et al.

(10) Patent No.: US 8,538,177 B2
(45) Date of Patent: Sep. 17, 2013

(54) LINE AND PIXEL BASED METHODS FOR INTRA FRAME CODING

(75) Inventors: Jizheng Xu, Beijing (CN); Xiulian Peng, Redmond, WA (US); Feng Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 311 days.

(21) Appl. No.: 12/847,001

(22) Filed: Jul. 30, 2010

(65) Prior Publication Data

US 2012/0027313 A1 Feb. 2, 2012

(51) Int. Cl.
*H04N 7/50* (2006.01)
(52) U.S. Cl.
USPC ............ 382/238; 382/232; 382/233; 382/236
(58) Field of Classification Search
USPC ................. 382/240, 248, 232, 233, 239, 251, 382/100, 299, 303, 236, 238; 345/531, 547; 348/716, 384.1; 375/240.03, 240.29; 713/176
See application file for complete search history.

(56) References Cited

U.S. PATENT DOCUMENTS

| | | | |
|---|---|---|---|
| 5,475,434 A * | 12/1995 | Kim ......................... | 375/240.24 |
| 6,088,047 A * | 7/2000 | Bose et al. .................... | 345/547 |
| 6,654,419 B1 | 11/2003 | Sriram | |
| 7,174,051 B2 * | 2/2007 | Kondo et al. ................. | 382/299 |
| 7,480,392 B2 * | 1/2009 | Shin et al. .................... | 381/419 |
| 7,561,620 B2 | 7/2009 | Winder | |
| 2006/0029136 A1 | 2/2006 | Cieplinski | |
| 2007/0171978 A1 | 7/2007 | Chono | |
| 2008/0260031 A1 | 10/2008 | Karczewicz | |
| 2008/0310506 A1 | 12/2008 | Xu | |
| 2010/0091860 A1 | 4/2010 | Anisimov | |

OTHER PUBLICATIONS

De Kock et al., YAPI: Application Modeling for Signal Processing Systems, Proc 37$^{th}$ Design Automation Conference (DAC 2000), 5 pages (2000).
Peng et al., Improved Line-based Image Coding by Exploiting Long-Distance Correlations, Conference on Visual Communications and Image Processing, Huangshan, China, Jul. 11, 2010, Proc. SPIE 7744, published online Aug. 4, 2010, (8 pages).
Peng et al., Line-based Image Coding using Adaptive Prediction Filters, Proceedings of the 2010 IEEE International Symposium on Circuits and Systems, Paris, France, May 30-Jun. 2, 2010 (4 pages).
Tziritas et al., Predictive Coding of Images Using an Adaptive Intra-Frame Predictor and Motion Compensation, Signal Processing Image Communication 4:457-476 (1992).
Yang, et al., Description of video coding technology proposal by Huawei Technologies & Hisilicon Technologies, Joint Collaborative Team on Video Coding, 1$^{st}$ Meeting, Dresden, DE (Apr. 2010).

* cited by examiner

*Primary Examiner* — Anh Do
(74) *Attorney, Agent, or Firm* — Klarquist Sparkman, LLP

(57) ABSTRACT

Images can be coded based on filters defined by filter coefficients or weights assigned to previously decoded pixel values of nearby lines. The filter coefficients can be selected based on evaluation of a set of predetermined filters, or filters can be adaptively generated and then evaluated. The filters generally are based on pixel values in previous rows or columns, but not values in the current row or column. In some examples, filters are adaptively generated pixel by pixel, or portions of previous rows, columns, or previously decoded portions of the current row or columns are used to provide line templates. A filter is generally selected to reduce coding error based on a least square difference between the current value and a prediction.

22 Claims, 5 Drawing Sheets

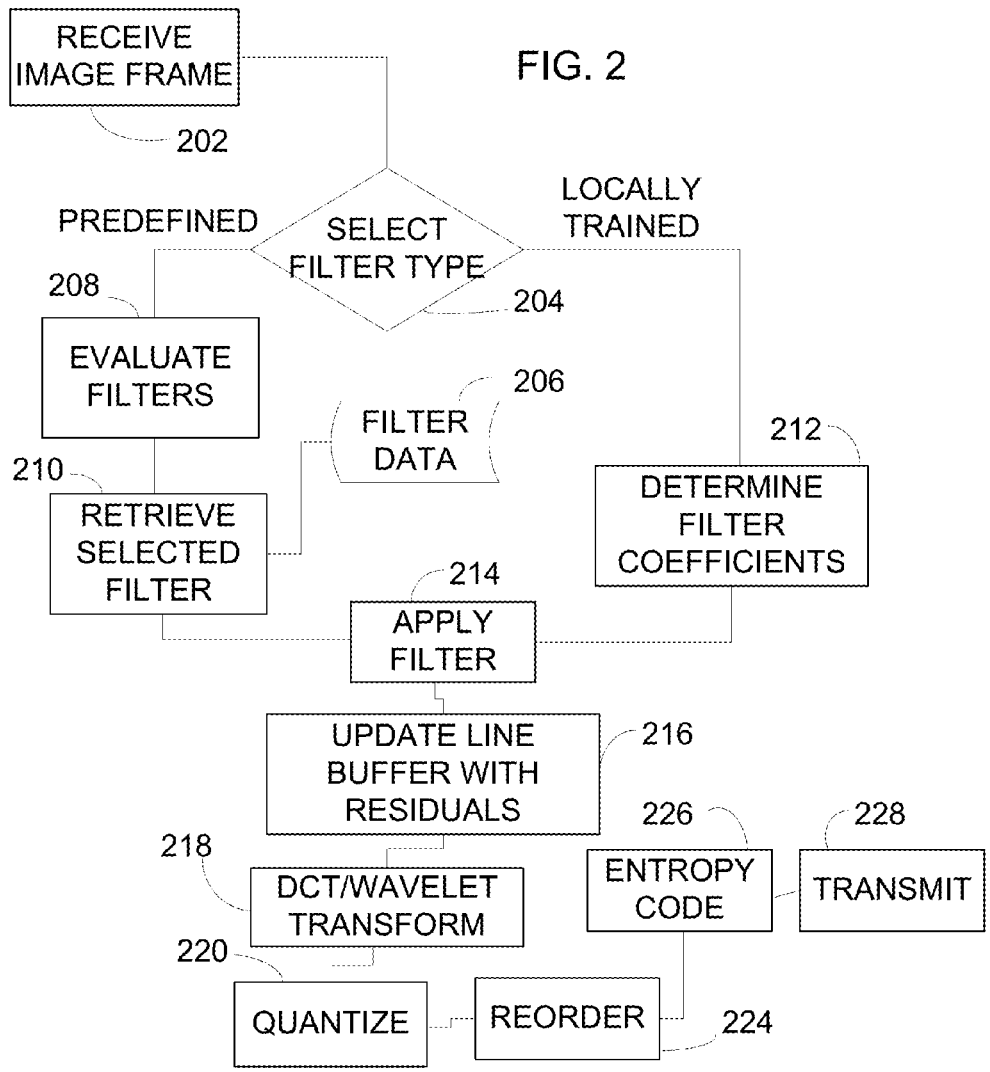
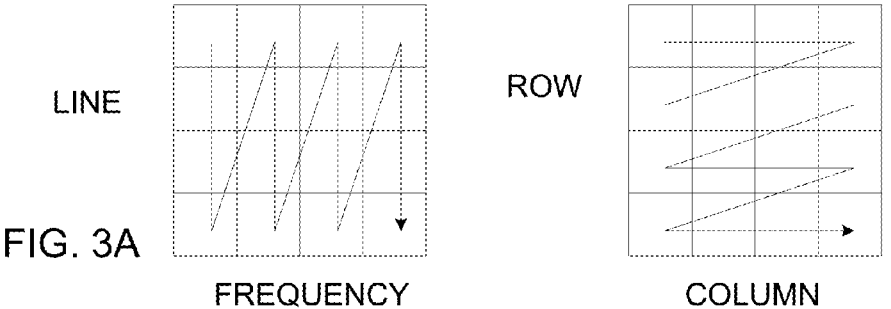

LINE AND PIXEL BASED METHODS FOR INTRA FRAME CODING

TECHNICAL FIELD

The disclosure pertains to image encoding and decoding.

BACKGROUND

Video data compression methods have been developed that permit the communication of moving images as digital data at readily available bit rates while generally preserving image quality. Conventional video compression methods generally use block-based methods such as block-based prediction in which each pixel in a current block is predicted based on reconstructed boundaries of neighboring blocks. However, prediction distances increase for pixels that are more distant from block boundaries. Thus, block based methods tend to be less efficient or less accurate for such pixels. Alternative methods are needed that can provide improved accuracy with lower coding overhead.

SUMMARY

Image coding methods comprising receiving an image associated with a plurality of lines of pixels and selecting a prediction filter for coding a current line of pixels in the image. The prediction filter is based on a predetermined set of pixel locations in at least two previous lines. Filter coefficients associated with the set of pixel locations are obtained, and estimates for the current line are provided based on the filter coefficients and the pixel values associated with the pixel locations. In some examples, residuals associated with a difference between the estimates and received pixel values associated with the current line are determined, and the residuals are communicated. In other examples, the filter coefficients are obtained based on differences between predicted values for at least one pixel in the current line and corresponding estimated values produced from a predetermined filter set. In some examples, the filter coefficients are selected using a least squares evaluation. For example, the filter coefficients can be obtained based on the differences $$\left[ x_j - \sum_{k=0}^{L_i-1} \omega_{i,k} \cdot y_{j,k} \right],$$

wherein $L_i$ is a length of an $i^{th}$ filter, $\omega_{i,k}$ are coefficients of the $i^{th}$ filter, $N_f$ is a number of available filters for selection, $x_j$, $j=0, 1, \ldots, N_S-1$ denotes sample pixel values to be predicted, and $y_{i,k}$, $k=0, 1, \ldots, L_i-1$, $i=0, 1, \ldots, N_f-1$ denote sample pixel values used to predict $x_j$.

In other examples, the filter coefficients are obtained by selecting a particular filter from a set of predetermined filters. In particular embodiments, the filter coefficients are obtained by selecting the particular filter based on at least one difference between a predicted value and a received value. In some examples, the lines of pixels are columns of pixels. In alternative embodiments, the prediction filter is selected based on a predetermined set of pixel locations in at least two previous lines and not the current line.

Image coding apparatus comprise a memory configured to receive at least one image, and a processor configured to retrieve the stored at least one image and select a prediction filter by comparing predicted image values for a current line based on image values in previous lines to actual image values in the current line. The processor is further configured to determine image residuals associated with the current line. In some examples, the processor is configured to select a prediction filter based on a received first data flag associated with selection of row, pixel, or column-based coding and a second data flag associated with selecting filter coefficients from coefficients generated using previous image values or selecting filter coefficients from a set of stored coefficients. In other examples, the processor is configured to apply a Fourier transform to the residuals.

Methods include receiving an encoded image that includes a first data flag associated with whether the image was encoded with block-based or line-based encoding, and based on the first data flag, decoding the encoded image. In additional examples, the encoded image further includes a second data flag associated with whether the encoded image was encoded with row-based or column-based encoding, and wherein the encoded image is decoded based on the first and second data flags. In further examples, if the first data flag indicates line-based encoding, the decoding includes obtaining filter coefficients based on selected previously decoded values. According to other examples, the previously decoded values are obtained from at least one previously decoded line. In additional embodiments, the prediction filter is adaptively defined based on pixel values associated with the at least two previous lines. In some examples, the adaptively predicted filter is defined by filter weighting factors $\omega_i$, $i=0, 1, \ldots, L-1$, wherein i is an integer and L is a number of pixels used to define the adaptively predicted filter. In further examples, the prediction filter is adaptively defined based on a line template associated with a plurality of previously decoded values. In other examples, the prediction filter is adaptively defined pixel by pixel for a set of pixels to be decoded based on previously decoded values.

These and other features and aspects of the technology are set forth below with reference to the accompanying drawings.

BRIEF DESCRIPTION OF THE DRAWINGS

FIG. 2 illustrates a representative LIC coding method.

FIGS. 3A-3B illustrate scanning orders for row-by-row LIC. FIG. 3A illustrates low frequency to high frequency scanning for coding in which a discrete cosine transform (DCT) is applied. FIG. 3B illustrates row by row scanning for coding without a DCT.

DETAILED DESCRIPTION

Figure 1:
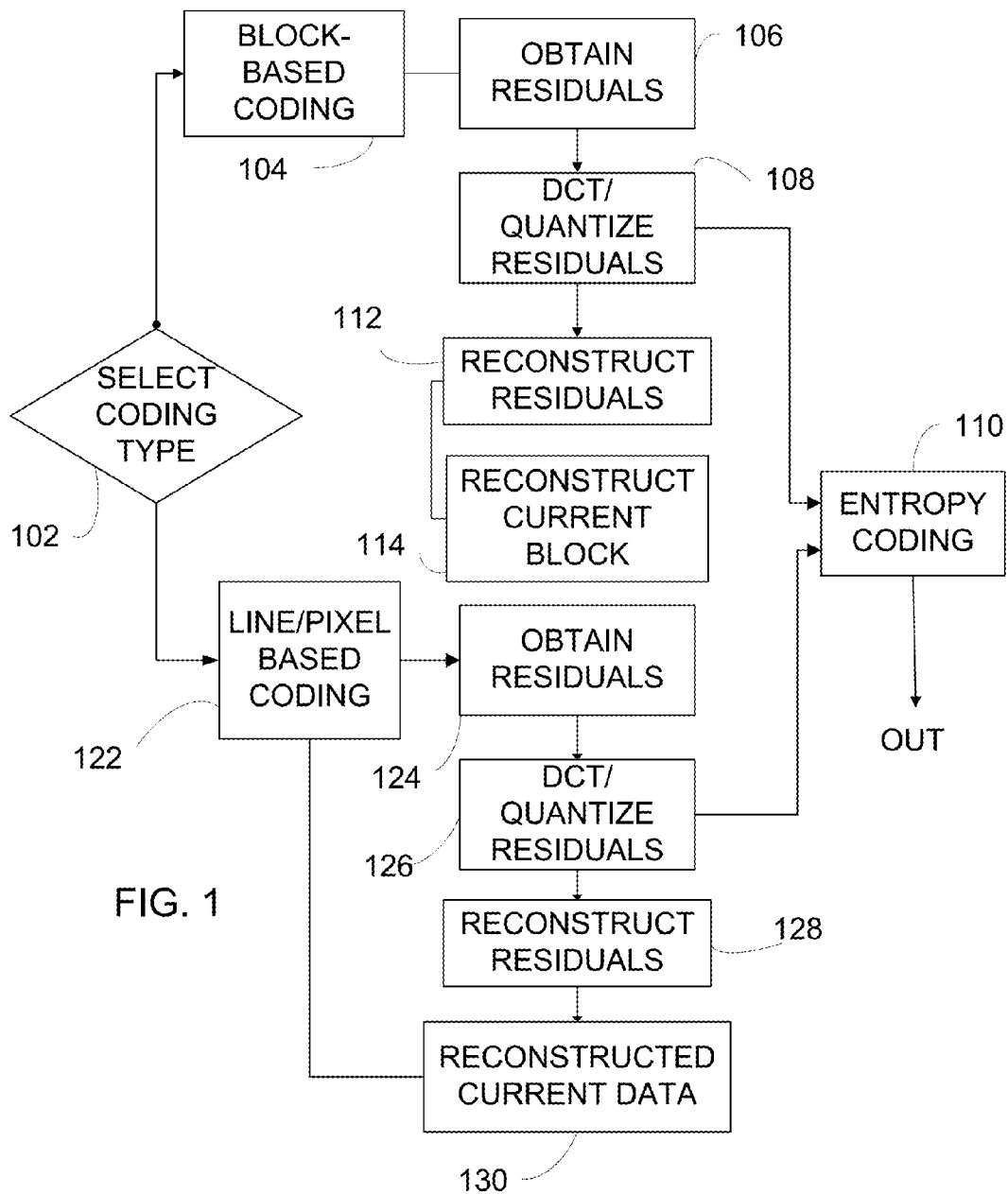
FIG. 1 illustrates a method for selectively coding using block-based intra prediction coding (BIP), line-based image coding (LIC), or pixel-based image coding (PIC).

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Disclosed herein are methods and apparatus for encoding and decoding (hereinafter "coding") data, typically image data and moving image (video) data. Such methods provide alternatives to conventional approaches. For convenience, various aspects of the disclosed technology are set forth sequentially below.

Image data can be represented as an array of pixel values, wherein each pixel is associated with one or more values. For example, a pixel can be represented by three values corresponding to red, green, and blue (RGB), or cyan, magenta, and yellow.

However, typically image data is stored and processed based on a YCbCr color space in which each pixel is associated with a luminance value (luma) Y, a blue color difference value Cb, and a red color difference Cr. Such a representation is generally preferred as different resolutions can be provided for luma, blue color difference, and yellow color difference, respectively. Pixel values for Y, Cb, Cr can be represented with a preferred numbers of bits, typically 2, 4, 8, 16 or other powers of two. In the description below, encoding of image pixel values Y, Cb, Cr is described. Typically, an estimate for a Y, Cb, or Cr pixel value is obtained, and residual values ("residuals") are obtained based on a difference between the estimates and actual values. In addition, the examples are generally described with reference to row by row encoding and decoding, but in other examples, coding and/or decoding are performed column by column.

For convenient illustration, three approaches to image coding are described below. The described approaches can be combined with conventional H.264 intra coding. These three approaches are referred to herein as Adaptive Line-Based Prediction (ALP), Adaptive Pixel-by-Pixel Prediction (APP), and Line-Based Template Matching (LTM). Some of these approaches are based on row by row or column by column processing. As used herein, row-based coding and column-based coding are referred to as line-based coding, and rows or columns are referred to as lines. For convenience, row-based coding is described below but in other example coding is column based.

Referring to FIG. 1, at 102 either a block-based coding method such as block-based intra prediction coding (BIP), line-based image coding (LIC), or pixel by pixel image coding (PIC) is selected. Upon selection of BIP, the selected block-based coding is applied at 104, and residuals associated with a difference between the encoded data and the actual current data are obtained at 106. The residuals can be transformed with a Discrete Fourier Transform (DCT) or other transform, and quantized at 108. The quantized residuals are entropy encoded at 110 for communication. In addition, the residuals are reconstructed by inverse quantization and an inverse DCT at 112 to permit reconstruction of the current block at 114. The reconstructed current block cab also be coupled for use in block based coding process at 104.

Alternatively, LIC or PIC can be selected at 102 and applied at 122. Residuals are obtained at 124, and in some cases, a 1-dimensional DCT followed by quantization is applied at 126. Alternatively, the residuals can be quantized without application of a DCT. The processed residuals are entropy coded at 110. The residuals are reconstructed at 128 and current data is reconstructed at 130 based on the reconstructed originals. In addition, the reconstructed current data is provided to the line or pixel based coding process at 122.

Row or Column Based Image Encoding/Decoding

A representative method of line or column based encoding is illustrated in FIG. 2. At 202, image frame data is received either as unencoded data for encoding or encoded data for decoding. Such data can include Y, Cb, and/or Cr data, image residuals, or other image data. A filter type for subsequent processing is selected at 204. Processing based on a predefined filter set or filter sets or based on locally trained filters can be selected. In a typical example using predefined filters, a set of predefined filters stored in a memory or other storage 206 is provided, and one or more of these filters is evaluated at 208. Based on this evaluation, filter values for a selected filter are retrieved and selected for subsequent use at 210. Alternatively, if a locally trained filter type is selected, potential locally trained filters are generated and evaluated at 212. Based on the evaluation, filter coefficients that define a preferred filter are selected at 213. At 214, the selected filter is applied and encoding residuals for one or more pixel values are determined. The residuals for some or all pixels in the selected line can be stored in a buffer at 216. In some cases, the residuals exhibit some correlation, or further processing of the residuals is otherwise advantageous. If so, a one dimensional discrete cosine transform (DCT) or a wavelet transform can be applied at 218. The transformed residuals can be quantized at 220 and reordered at 224. The processed residuals are entropy coded at 226 for transmission at 228. In some cases, the residuals are sparse, and are directly quantized at 220 without application of the 1-D DCT at 218.

Frequency domain coefficients (if a DCT was applied) or residuals can be reordered at 224 prior to entropy coding 226. If a DCT was applied, frequency domain coefficients are scanned from low frequencies to higher frequency as shown in FIG. 3A into a one dimensional buffer. If a DCT was not applied, residuals are scanned line by line into a one-dimensional buffer as shown in FIG. 3B. At 228, encoded results are transmitted, typically as entropy coded residuals and one or more filter characteristics, filter identifiers, or other information to be used to predict values.

A row-based on column-based encoding configuration can be indicated with one or more data flags that can be provided to a decoder. A first data flag can indicate whether block-based or row/column/pixel based-encoding was used. Encoding details for row/column-based encoding can be indicated within the encoded data using one or more additional data flags that can be defined as one or more bits in the encoded data. For example, a second data flag can be set as a row/column flag that indicates whether encoding was row by row or column by column. A third data flag can be provided to indicate whether a filter was selected based on a filter obtained by local training or by retrieval from a predetermined filter set. Encoding with or without the DCT can be indicated with a data flag for each data block that is transmitted so that a decoder can recover pixel data appropriately. Setting a data flag (DCT/no DCT) at block level reduces coding overhead, but a DCT/no DCT decision can also be made line by line, column by column, or pixel by pixel with some increase in coding overhead. Thus, overhead flags of the form (row/column, LT/FS, transform/no transform) are provided to a decoder. Entropy coding can be based on context-adaptive binary arithmetic coding (CABAC) with frequency domain and residual domain context models based on whether or not a DCT was applied. These data flags can be encoded for transmission using CABAC with corresponding context models for each flag. In particular, if there is spatial correlation for certain flags in neighboring blocks, these can be encoded by CABAC with upper and left block flags as context. An additional data flag can be provided to indicated whether line by line coding (i.e., line-based coding) or pixel by pixel coding was used.

The selection of a particular coding configuration is typically based on performance trade-offs. A rate-distortion optimization method (RDO) can be used, and a preferred configuration selected by reducing or minimizing overall rate-distortion cost.

Example 1

Adaptive Line-Based Prediction (ALP)

In an example of ALP, each row or column is predicted from neighboring reconstructed rows or columns with an adaptive filter. Such an adaptive filter is based on neighboring reconstructed row or column data, and the adaptive filter can be estimated from these neighboring values without using any current line data. Therefore, such an adaptive filter can be made available at a decoder without transmission of filter coefficients.

One representative method of obtaining filter coefficients is referred to herein as local training (LT). In order to obtain a prediction for a pixel value x as a function of L other (previously reconstructed) pixel values $y_i$, $i=0, 1, \ldots, L-1$, filter weighting factors $\omega_i$, $i=0, 1, \ldots, L-1$ can be found as follows:

$$\omega_i = \operatorname{argmin}\left(E\left(\left[x - \sum_{k=0}^{L-1} \omega_k \cdot y_k\right]^T \cdot \left[x - \sum_{k=0}^{L-1} \omega_k \cdot y_k\right]\right)\right),$$

wherein k is an integer and $i=0, 1, \ldots, L-1$. As shown above, the differences can be conveniently represented as a column vector S having elements $x-\omega_i$ so that a sum of squares of differences can be obtained as a product of a transpose $S^T$ of the column vector S and S. Various values of filter coefficients $\omega_i$ can be tried, typically by permitting the filter coefficient for each of the selected reconstructed values $y_k$ to be zero or one. The minimization can be solved using a Least-Squares (LS) method or other method. In determining the weighting factors, pixel values x and $y_i$ are obtained based on reconstructed values from the neighborhood of the current line. In some examples, values associated with an approximate minimum can be selected if such values permit more compact encoding with acceptable error.

Figure 4A:
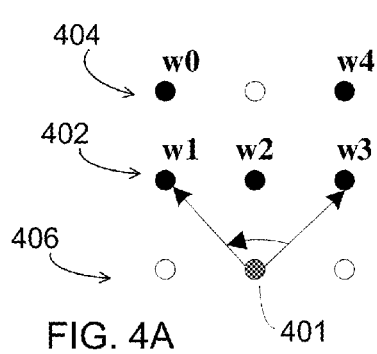
FIGS. 4A_4B illustrate pixels used for prediction in APP for row by row and column by column prediction, respectively.
Figure 4B:
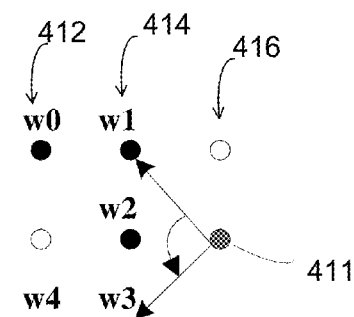

In this example, filters are based on a set of pixels selected and to which filter coefficients are assigned. Two examples of suitable pixel selections for L=5 pixels are shown in FIGS. 4A-4B. FIG. 4A illustrates a representative row-wise arrangement. Filter coefficients $w_0, \ldots w_4$ correspond to pixel values $y_0, \ldots y_4$, respectively, that are associated with rows 402, 404. A pixel 401 whose value is to be predicted is in a current row 406. Note that values for the current row 406 are generally unavailable. The filter coefficients $w_i$ can be obtained directly based on the above equation. A similar column-wise arrangement is illustrated in FIG. 4B. Filter coefficients $w_0, \ldots w_4$ correspond to pixel values $y_0, \ldots y_4$, respectively, that are associated with columns 412, 414. A pixel 411 whose value is to be predicted is in a current column 416. Note that values for the current column 416 may be generally unavailable. Row-based and column-based filter selection permits directional correlations to be accommodated to improve encoding and the generation of filter coefficients by local training permits an unlimited number of filters to be produced.

Figure 5A:
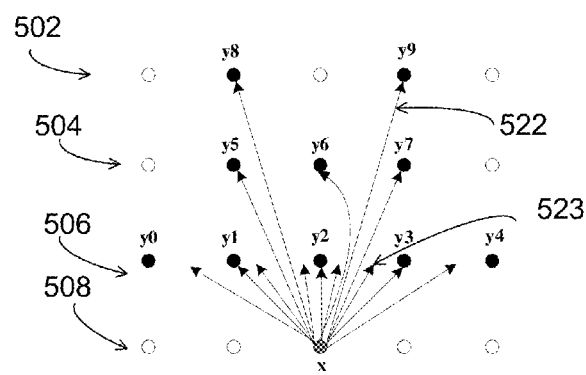
FIGS. 5A-5B illustrate templates for a row and a column, respectively The light gray squares denote the reconstructed templates and the dark gray ones denote the target pixels to be predicted.
Figure 5B:
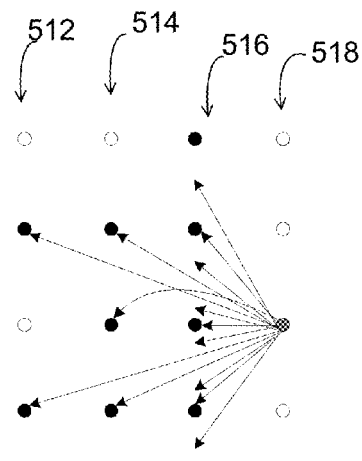

An adaptive filter can be selected based on five or more or fewer pixels in the same or different rows or columns. FIGS. 5A-5B illustrate selection of 10 pixels for row-wise and column wise filters, respectively. As shown in FIG. 5A, pixels from rows 502, 504, 506 having pixel values $y_0, \ldots, y_9$ are used to determine a filter for prediction of a pixel value x in a row 508. Similarly, as shown in FIG. 5B, pixels from columns 512, 514, 516 are used to determine a filter for prediction of a pixel value in a column 518.

Data values for pixels in lines near a line being encoded are typically preferred for use in predicting values in the current line. However, as more data values are used for prediction, the training data becomes less local to the data to be predicted. If fewer data values are used, a filter can be susceptible to noise and the filter coefficients may not be stable. Consequently, certain ranges of data values are typically preferred, generally based on two to forty data values in one to ten preceding lines. Upper, left, and upper-left neighboring reconstructed blocks can be used for training for the first line. For other lines, newly reconstructed lines in current block can be used so that filters are trained from data values in the neighborhood of the pixels to be encoded.

Example 2

Filter Lookup (FL)

In another approach, a set of filters is defined initially, and one of the filters of the set is selected for use. The filters are defined by filter coefficients or weights $\omega_k$ that are to be applied to pixel values $y_k$ for a set of k pixels. The selection of a suitable filter can be made in a manner similar to that in which an adaptive filter is selected. Let $x_j$, $j=0, 1, \ldots, N_S-1$ denote sample pixel values to be predicted and $y_{i,k}$, $k=0, 1, \ldots, L_i-1$, $i=0, 1, \ldots, N_f-1$ denote sample pixel values used to predict $x_j$, wherein $L_i$ is a length of the $i^{th}$ filter and $N_f$ is the number of available filters for selection. The coefficients of the $i^{th}$ filter can be denoted by $\omega_{i,\,k}$. Then, a filter can be selected based on a sum of squares of differences as follows:

$$i = \operatorname{argmin}\left(\frac{1}{N_s}\sum_{j=0}^{N_s-1}\left(\left[x_j - \sum_{k=0}^{L_i-1}\omega_{i,k}\cdot y_{j,k}\right]^2\right)\right),$$

wherein i denotes the filter that minimizes the above sum of squares of differences. In some cases, a filter is selected that reduces the above difference, but is not a minimum. Both the $x_j$ and the $y_{i,k}$ values can be reconstructed samples and so this process can be repeated at the decoder. A number of samples used to define filters is preferably selected to be sufficiently accurate while remaining relatively unaffected by local noise.

Filter lookup is based on a predetermined filter set with filters having fixed coefficients. In order to adapt to different image characteristics, multiple sets of filter coefficients can be adopted. Each reconstructed pixel can be classified into a filter group and then each filter group can update its filter coefficients dynamically using a LS algorithm. To preserve the local characteristics of the image, a K-length buffer is set for each group and only the newly reconstructed K pixels can be used for a filter update. Predetermined filters may require less overhead, and filters associated with edge directions, smoothness in a particular direction, or other features can be provided in a filter set. Representative filters can be based on selected pixels as illustrated in FIGS. 5A-5B. Note that these same pixel selections can be used to generate adaptive filters.

Representative filter coefficients for a set of predetermined filters associated with the pixel selection of FIGS. 5A-5B are summarized in Table 1 below. Other smaller, larger, and different sets can be selected. These filters are directional in that the values used for prediction (determined by the filter coefficients) can be based on reconstructed pixel values situated at one or more different relative orientations with respect to the values being encoded. For example, values above, below, or to the left or right of these values can be preferred. In some cases, filters extending in certain directions or using certain pixels can be provided in a so-called "smooth" version and a "sharp" version. A smooth filter uses a combination of relatively nearer samples along a particular direction whereas a sharp version uses only a single pixel along that direction. For example, as shown in FIG. 5A, along a direction 522 there are two filters that are available for prediction of x. Referring to Table 1, filter 15 is based on pixel values $y_2$ and $y_3$ while filter 13 is based on the value $y_9$ alone. Thus, filter 15 can be referred to as a "smooth" filter, while filter 16 is a "sharp" filter, wherein both are approximately directional along 522. Filter 14 is an additional "sharp" filter based on an average of $y_7$ alone (i.e., $\omega_i=0$ unless i=7) along a nearby direction 524. Filter directions are generally only approximately the same. A filter direction 523 associated with a $y_2/y_3$ based filter is in approximately the same direction as the direction 522 for the $y_9$ based filter.

TABLE 1

Representative Filters for Filter Lookup Based Prediction

| Filter # | Filter Coefficients | | | | | | | | | |
|---|---|---|---|---|---|---|---|---|---|---|
| | $\omega_0$ | $\omega_1$ | $\omega_2$ | $\omega_3$ | $\omega_4$ | $\omega_5$ | $\omega_6$ | $\omega_7$ | $\omega_8$ | $\omega_9$ |
| 1 | ½ | ½ | 0 | 0 | 0 | 0 | 0 | 0 | 0 | 0 |
| 2 | ¼ | ½ | ¼ | 0 | 0 | 0 | 0 | 0 | 0 | 0 |

TABLE 1-continued

Representative Filters for Filter Lookup Based Prediction

| Filter # | Filter Coefficients | | | | | | | | | |
|---|---|---|---|---|---|---|---|---|---|---|
| | $\omega_0$ | $\omega_1$ | $\omega_2$ | $\omega_3$ | $\omega_4$ | $\omega_5$ | $\omega_6$ | $\omega_7$ | $\omega_8$ | $\omega_9$ |
| 3 | 0 | 1 | 0 | 0 | 0 | 0 | 0 | 0 | 0 | 0 |
| 4 | 0 | ¾ | ¼ | 0 | 0 | 0 | 0 | 0 | 0 | 0 |
| 5 | 0 | 0 | 0 | 0 | 0 | 1 | 0 | 0 | 0 | 0 |
| 6 | 0 | ½ | ½ | 0 | 0 | 0 | 0 | 0 | 0 | 0 |
| 7 | 0 | 0 | 0 | 0 | 0 | 0 | 0 | 0 | 1 | 0 |
| 8 | 0 | ¼ | ¾ | 0 | 0 | 0 | 0 | 0 | 0 | 0 |
| 9 | 0 | 0 | 1 | 0 | 0 | 0 | 0 | 0 | 0 | 0 |
| 10 | 0 | ¼ | ½ | ¼ | 0 | 0 | 0 | 0 | 0 | 0 |
| 11 | 0 | 0 | 0 | 0 | 0 | 0 | 1 | 0 | 0 | 0 |
| 12 | 0 | 0 | ¾ | ¼ | 0 | 0 | 0 | 0 | 0 | 0 |
| 13 | 0 | 0 | 0 | 0 | 0 | 0 | 0 | 0 | 0 | 1 |
| 14 | 0 | 0 | 0 | 0 | 0 | 0 | 1 | 0 | 0 | 0 |
| 15 | 0 | 0 | ½ | ½ | 0 | 0 | 0 | 0 | 0 | 0 |
| 16 | 0 | 0 | ¼ | ¾ | 0 | 0 | 0 | 0 | 0 | 0 |
| 17 | 0 | 0 | 0 | 1 | 0 | 0 | 0 | 0 | 0 | 0 |
| 18 | 0 | 0 | ¼ | ½ | ¼ | 0 | 0 | 0 | 0 | 0 |
| 19 | 0 | 0 | 0 | ½ | ½ | 0 | 0 | 0 | 0 | 0 |
| 20 | 0 | ⅓ | ⅓ | ⅓ | 0 | 0 | 0 | 0 | 0 | 0 |
| 21 | 0 | 0 | 0 | 0 | 0 | ⅓ | ⅓ | ⅓ | 0 | 0 |

Example 3

Line-Based Template Matching (LTM)

Figure 6A:
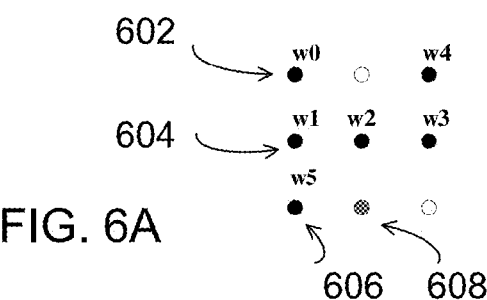
FIGS. 6A-6B illustrate coding based on line template matching.
Figure 6B:
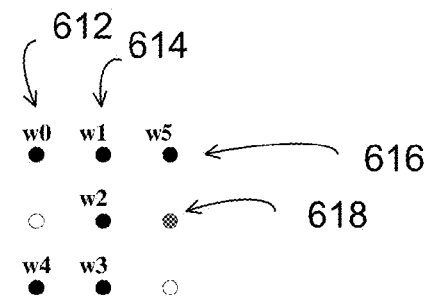

Line-based coding (and pixel by pixel coding described below) is intended to take advantage of local correlation and is accordingly based on pixel values for pixels that are not too distant from the current pixel. Longer range correlations within a current frame can be incorporated by coding so that lines (rows or columns) are predicted and reconstructed as unit. Such coding is referred to herein as line template matching. As shown in FIGS. 6A-6B, an image frame is received at 602, and a current line (or portion) is selected at 604. Multiple candidate lines of the received image frame are evaluated as a match to the current line at 606, and one or a combination of these lines are selected at 608. The lines can be selected based on reducing a mean, mean square, or other deviation of a predicted value from the combination of the candidate lines. A convenient search range is within a 16 pixel by 16 pixel block. A line residual is determined and quantized at 610 and entropy coding performed at 612. The current line can be reconstructed by inverse quantization, and is then included among candidate template lines in coding of subsequent lines. A next line can be estimated based on an extrapolation of the current reconstructed line and neighboring pixels. Because the current line can be reconstructed by itself instead of using its prediction as a template for the next line, there is no error propagation within the current block.

In comparison with block-based template approaches, in LTM each pixel has the same or substantially the same distance to the template, so that all pixels are equally likely to be predicted accurately, and correlation between the template and current line is typically stronger than that in block-based approached. In addition, candidates can come from different parts of a reconstructed area and a greater variety of choices is available in LTM.

Figure 7A:
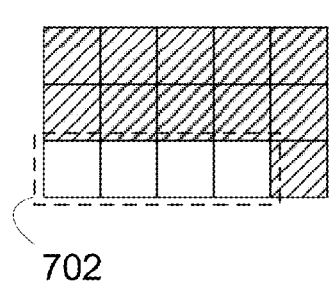
FIG. 7A-7B illustrate row based templates and column based templates, respectively.
Figure 7B:
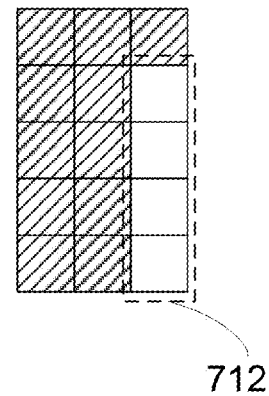

Line-based templates can be either row-based on column-based. FIGS. 7A-7B illustrate representative current pixels 702, 712 that are part of a row or a column, respectively, along with eleven additional template pixels (reconstructed pixels) surrounding the current line (row or column) that are selected for matching. More or fewer pixels and lines can be selected.

A larger template will be less local while a smaller template may be less suitable for accommodating different patterns and two dimensional correlations. The similarity between two templates can be assessed based on a sum of absolute differences (SAD) or other metric. A particular prediction method can be selected based on constraints on data rate and distortion, and coded data can be provided with a flag that indicates whether L™ is used.

Pixel-By-Pixel Image Encoding/Decoding

While line- or row-based prediction can be used as described above, similar prediction can be done on a pixel by pixel basis in a selected block of pixels. Values for each pixel in a block can be predicted and quantized for reconstruction at a decoder. Each pixel of the current block is first predicted from the reconstructed neighboring pixels with an adaptive filter and then quantized and reconstructed. This process repeats for each pixel until all are reconstructed. The coefficients of a current block are then entropy coded as a whole.

Filters can be selected based on local training or from a set of predefined filters as described above for line-based coding. However, because reconstruction is pixel by pixel, an adjacent pixel in the same row or column is generally available so that filters can be based on values in the same row or column as the pixel being processed. Similar to ALP, the prediction filter for each pixel is obtained completely from its reconstructed neighborhood, without using any information from the current pixel. A suitable filter can be generated (locally trained) or selected from a predetermined set. Either or both of these approaches can be used to select a suitable filter.

Figure 8A:
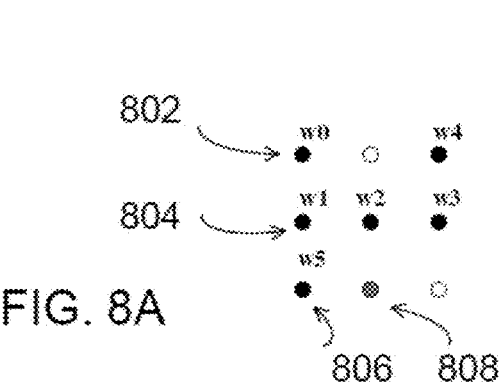
FIGS. 8A-8B illustrate filter coefficients and weights of pixel by pixel adaptive coding.
Figure 8B:
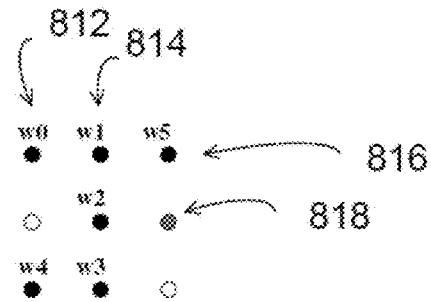

Since a current block is reconstructed pixel by pixel, a pixel to the left of a current pixel (in row by row processing) or above a current pixel (in column by column processing) is available, and can be used in filter generation or included in pixels used by a predetermine set of filter in filter lookup. Referring to FIG. 8A, weights (filter coefficients) $w_0, \ldots w_5$ associated with reconstructed pixels in rows 802, 804, and a left adjacent pixel 806 in the same row as a current pixel 808 can be used in producing a suitable filter for processing current pixel 808. In addition, predetermined weights for the pixel 806 can be included in filter definitions in a set of filters, increasing the number of available filters. FIG. 8B illustrates a column by column example in which pixels in columns 812, 814 and an adjacent upper pixel 816 in the same row as a current pixel 818 are used to either generate a filter or are included in stored filter definitions.

In pixel-by-pixel processing, the current pixel value is quantized and reconstructed, and no DCT is needed. For every pixel, a filter (typically the best filter as defined by minimization of a sum of squares of differences) is selected, so that the computational complexity of pixel by pixel processing can be larger than that of line-based coding. For this reason, it may be preferable to use the pixel-based approached only for smaller data blocks such as 4×4 data blocks.

The three examples outlined above offer different performance characteristics. Adaptive line prediction (ALP) and adaptive pixel by pixel (APP) prediction are typically more appropriate at higher bit rates as they are based on the assumption that neighboring lines conform to similar correlation models. When quantization is large, this assumption is incorrect, and while ALP and APP provide satisfactory results, little performance improvement is provided at low bitrates. In contrast, line template matching typically offers improved performance at both high and low bit rates.

Computing Environment

Figure 9:
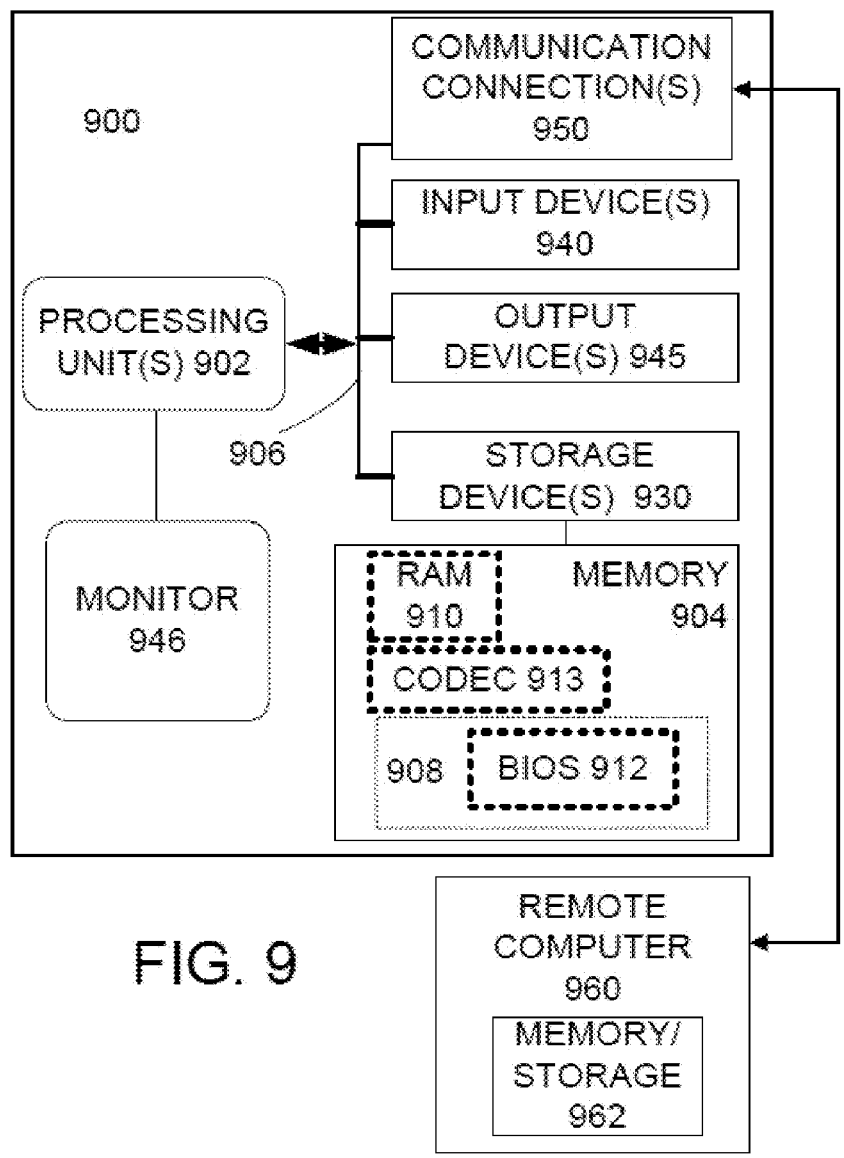
FIG. 9 illustrates a representative computing environment for implementation of the disclosed methods.

FIG. 9 and the following discussion are intended to provide a brief, general description of an exemplary computing environment in which the disclosed technology may be implemented. Although not required, the disclosed technology is described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 9, an exemplary system for implementing the disclosed technology includes a general purpose computing device in the form of an exemplary conventional PC 900, including one or more processing units 902, a system memory 904, and a system bus 906 that couples various system components including the system memory 904 to the one or more processing units 902. The system bus 906 may be any of several types of bus structures including a memory bus or memory controller, a peripheral bus, and a local bus using any of a variety of bus architectures. The exemplary system memory 904 includes read only memory (ROM) 908 and random access memory (RAM) 910. A basic input/output system (BIOS) 912, containing the basic routines that help with the transfer of information between elements within the PC 900, is stored in ROM 908. In addition line or pixel based prediction methods are stored as computer-executable instructions in ROM 913 or in other computer-readable storage media.

The exemplary PC 900 further includes one or more storage devices 930 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 906 by a hard disk drive interface, a magnetic disk drive interface, and an optical drive interface, respectively. The drives and their associated computer-readable media provide nonvolatile storage of computer-readable instructions, data structures, program modules, and other data for the PC 900. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 930 including an operating system, one or more application programs, other program modules, and program data. A user may enter commands and information into the PC 900 through one or more input devices 940 such as a keyboard and a pointing device such as a mouse. Other input devices may include a digital camera, microphone, joystick, game pad, satellite dish, scanner, or the like. These and other input devices are often connected to the one or more processing units 902 through a serial port interface that is coupled to the system bus 906, but may be connected by other interfaces such as a parallel port, game port, or universal serial bus (USB). A monitor 946 or other type of display device is also connected to the system bus 906 via an interface, such as a video adapter. Other peripheral output devices, such as speakers and printers (not shown), may be included.

The PC 900 may operate in a networked environment using logical connections to one or more remote computers, such as a remote computer 960. In some examples, one or more network or communication connections 950 are included. The remote computer 960 may be another PC, a server, a router, a network PC, or a peer device or other common network node, and typically includes many or all of the elements described above relative to the PC 900, although only a memory storage device 962 has been illustrated in FIG. 9. The personal computer 900 and/or the remote computer 960 can be connected to a logical a local area network (LAN) and a wide area network (WAN). Such networking environments are commonplace in offices, enterprise-wide computer networks, intranets, and the Internet.

When used in a LAN networking environment, the PC 900 is connected to the LAN through a network interface. When used in a WAN networking environment, the PC 900 typically includes a modem or other means for establishing communications over the WAN, such as the Internet. In a networked environment, program modules depicted relative to the personal computer 900, or portions thereof, may be stored in the remote memory storage device or other locations on the LAN or WAN. The network connections shown are exemplary, and other means of establishing a communications link between the computers may be used.

Having described and illustrated the principles of the disclosed technology with reference to the illustrated embodiments, it will be recognized that the illustrated embodiments can be modified in arrangement and detail without departing from such principles. For instance, elements of the illustrated embodiment shown in software may be implemented in hardware and vice-versa. Also, the technologies from any example can be combined with the technologies described in any one or more of the other examples. In view of the many possible embodiments to which these principles may be applied, it should be recognized that the illustrated embodiments are examples and should not be taken as a limitation on the scope of the disclosed technology. For instance, various components of systems and tools described herein may be combined in function and use. Alternatives specifically addressed in this disclosure are merely exemplary and do not constitute all possible alternatives to the embodiments described herein. We therefore claim all subject matter that comes within the scope and spirit of the appended claims.

We claim:

1. An image coding method, comprising:
in an image encoder, receiving an image associated with a plurality of lines of pixels;
selecting a prediction filter for coding a current line of pixels in the image, wherein the prediction filter is based on a predetermined set of pixel locations in at least two previous lines;
obtaining filter coefficients associated with the set of pixel locations; and
determining estimates for the current line based on the filter coefficients and pixel values associated with the pixel locations.

2. The method of claim 1, further comprising determining residuals associated with a difference between the estimates and received pixel values associated with the current line.

3. The method of claim 2, further comprising communicating the residuals.

4. The method of claim 1, wherein the filter coefficients are obtained based on differences between predicted values for at least one pixel in the current line and corresponding estimated values from a predetermined filter set.

5. The method of claim 4, wherein the filter coefficients are obtained based on differences $$\left[ x_j - \sum_{k=0}^{L_i - 1} \omega_{i,k} \cdot y_{j,k} \right],$$

wherein $L_i$ is a length of an $i^{th}$ filter, $\omega_{i,k}$ are coefficients of the $i^{th}$ filter, $N_f$ is a number of available filters for selection, $x_j, j = 0, 1, \ldots, N_s - 1$ denotes sample pixel values to be predicted, and $y_{j,k}, k = 0, 1, \ldots, L_i - 1, \ldots, N_f - 1$ denote sample pixel values used to predict $x_j$.

6. The method of claim 1, wherein the filter coefficients are obtained by selecting a particular filter from a set of predetermined filters.

7. The method of claim 6, wherein the filter coefficients are obtained by selecting the particular filter based on at least one difference between a predicted value and a received value.

8. The method of claim 1, wherein the lines of pixels are columns of pixels.

9. The method of claim 1, wherein the selecting the prediction filter is based on a predetermined set of pixel locations in at least two previous lines and not the current line.

10. An image coder, comprising:
a memory configured to receive at least one image;
a processor configured to retrieve the stored at least one image, select a prediction filter by comparing predicted image values for a current line based on image values in previous lines to actual image values in the current line and determine image residuals associated with the current line.

11. The image coder of claim 10, wherein the processor is configured to select a prediction filter based on a received first data flag associated with selection of row, pixel, or column-based coding and a second data flag associated with selecting filter coefficients from coefficients generated based on previous image values or selecting filter coefficients from a set of stored coefficients.

12. The image coder of claim 10, wherein the processor is configured to apply a Fourier transform to the residuals.

13. A method, comprising:
with an image decoder, receiving an encoded image that includes a first data flag indicating that the image was encoded with line-based encoding; and
based on the first data flag, decoding the encoded image.

14. The method of claim 13, wherein the encoded image further includes a second data flag associated with whether the encoded image was encoded with row-based or column-based encoding, and wherein the encoded image is decoded based on the first and second data flags.

15. The method of claim 13, wherein if the first data flag indicates line-based encoding, the decoding includes obtaining filter coefficients based on selected previously decoded values.

16. The method of claim 15, wherein the previously decoded values are obtained from at least one previously decoded line.

17. The method of claim 13, wherein the prediction filter is adaptively defined based on pixel values associated with the at least two previous lines.

18. The method of claim 17, wherein the prediction filter is defined by filter weighting factors $\omega_i$, $i=0,1,\ldots,L-1$, wherein i is an integer and L is a number of pixels used to define the prediction filter.

19. The method of claim 18, wherein the prediction filter is adaptively defined based on a line template associated with plurality of previously decoded values.

20. The method of claim 18, wherein prediction filter is adaptively defined for each pixel to be decoded from a set of pixels based on previously decoded values.

21. A computer readable storage device comprising computer-executable instructions for a method comprising:
   receiving an encoded image that includes a first data flag indicating that the image was encoded with line-based encoding; and
   based on the first data flag, decoding the encoded image.

22. The computer readable storage device of claim 21, wherein the encoded image further includes a second data flag associated with whether the encoded image was encoded with row-based or column-based encoding, and wherein the encoded image is decoded based on the first and second data flags.

* * * * *